Patented June 18, 1929.

1,717,920

UNITED STATES PATENT OFFICE.

VALENTINE GILBERT, OF VIRGINIA CITY, MONTANA.

PROCESS OF PRODUCING A LOW-ALCOHOL BEVERAGE FROM BEER.

No Drawing. Application filed May 11, 1927. Serial No. 190,661.

As may be inferred from the above title, my invention presupposes the brewing of a beer. Said beer, constituting the raw material for my process, may be assumed to have an alcohol content considerably in excess of the present legal maximum,—one-half of one per cent; and the process upon which protection is herein sought includes not only a bacterial fermentation of the mentioned alcohol, to bring the same to or below the mentioned legal maximum, but also a complete or partial neutralization of the resultant acid,—to provide a beer having a predetermined low alcohol content and also a predetermined low acidity. In preferred embodiments of my invention, the mentioned neutralization may be effected by an addition of a suitable reagent such as sodium bicarbonate, or any preferred carbonate, in such manner as to assure a desired flavor and/or carbon dioxide content in the ultimate beverage, as prepared for consumption or transport storage.

Other objects of my invention may be best appreciated from the following description of an illustrative embodiment thereof, taken in connection with the appended claims.

It being well known that the alcohol content of an alcoholic beverage, such as beer, may be entirely or largely converted into acetic acid or into lactic acid by various species or races of bacteria, assuming a beer to have been so produced as to have an alcohol content of (say) 2 to 3.5%, more or less, I may subject the same to fermentation by a selected "organized ferment", such as *Bacillus Delbrucki* or *Bacillus Bulgaricus* (for lactic acid production) or to the action of a "vinegar-forming" bacterium (for an acetous fermentation) or two or more of these or similar organisms,—the temperature being maintained at a suitable elevation for a period sufficient to reduce the alcohol content to a desired level below the permissible maximum of one-half of one per cent (or even substantially to zero, in case a non-alcoholic beverage is desired).

In view of the limited demand for a "near-beer" or beer-like beverage comparable with "lager-beer" or "Weiss-beer" and, in view of the attractiveness of beverages containing sodium lactate or sodium acetate or a mixture of sodium lactate and sodium acetate, I may next neutralize the acidity of the beer, to any desired level, or lower its acid content, by the addition of a suitable carbonate or bicarbonate; and, I may either thereafter introduce carbon dioxide from an outside source, under pressure; or, to effect a simultaneous neutralization, (or partial neutralization) and carbonating effect, I may add sodium bicarbonate, or the like, while maintaining sufficient pressure substantially to prevent escape of evolved carbon dioxide,—this giving somewhat the effect of a "Kraeusened" beer, but without the delay (sometimes amounting to 30 or more days) involved in a "Kraeusening" process.

Assuming any beer used as raw material (which may be of any preferred character) to have been properly produced and pasteurized, and assuming that my product is to be bottled, it may be finally subjected to an additional pasteurization and filtration, to produce a perfectly clear and stable product; but, in case my product can be kept cool, for early consumption, no final pasteurization is really necessary; and it will be understood that my product may retain any desired alcoholic content, and that it may owe a slightly tart and an uncommonly pleasant flavor not only to an avoidance of any distillation (which would tend to drive off the aromatic bodies, ethers, esters, acids, etc. that give it an attractive "bouquet") but to the presence of sodium acetate or lactate or both in addition to any desired percentage of acetic or lactic acid or mixture of both acids and carbon dioxide.

Although pasteurization and filtration may be regarded as essential to perfect stability and clarity, in case the beneficial effects of my beverage are to be augmented by the presence of living lactic acid bacteria, or the like therein, for a known favorable action within the human body, it may obviously be advantageous to avoid, during and after the described use of an "organized ferment", any heating of the beverage to a high temperature; and it may be noted that, in case of acetous fermentation, the bacteria will continue active at temperatures substantially below those suitable to lactic fermentation.

Although I have herein described a single complete embodiment of my invention, it should be understood not only that various features thereof might be independently used but also that numerous modifications additional to those herein suggested, might readily be devised by workers skilled in the arts to which this case relates,—without involving the slightest departure from the spirit and scope of this invention, as the same is indicated above and in the following claims.

I claim as my invention:

1. In the production of a low-alcohol beverage from beer: subjecting the beer to an acid-forming fermentation of alcohol sufficient to reduce its alcohol content to or below the maximum percentage required by law; and reducing the resultant acidity to the percentage producing a desired flavor by the addition of a carbonate of sodium.

2. In the production of a low-alcohol beverage from beer: subjecting the beer to an acid-forming fermentation of alcohol sufficient to reduce its alcohol content to or below the maximum percentage required by law; and reducing the resultant acidity to the percentage producing a desired flavor by the addition of sodium bicarbonate.

3. In the production of a low-alcohol beverage from beer: subjecting the beer to an acid-forming fermentation of alcohol sufficient to reduce its alcohol content to or below the maximum percentage required by law; and reducing the resultant acidity to a desired level by the addition of sodium bicarbonate while preventing escape of evolved carbon dioxide.

4. In the production of a low-alcohol beverage from beer: converting the alcohol thereof in excess of the percentage required by law to acetic acid: and subsequently converting a portion of the acetic acid to a sodium acetate.

In testimony whereof, I have hereunto set my hand at Los Angeles, California, this 4th day of May, 1927.

VALENTINE GILBERT.